United States Patent [19]

Webster et al.

[11] 4,265,380

[45] May 5, 1981

[54] GARMENT HANGER LOCK

[76] Inventors: Noel E. Webster, 4811 Alhambra Ave., Martinez, Calif. 94553; Gary D. McLaughlin, 4051 Fairfax Dr., Napa, Calif. 94588

[21] Appl. No.: 61,017

[22] Filed: Jul. 26, 1979

[51] Int. Cl.[3] .......................... A47J 51/08; E05B 65/00

[52] U.S. Cl. .......................................................... 223/85

[58] Field of Search .................... 211/4, 7, 8, 9; 70/18, 70/59; 24/4; 223/85, 92, 88

[56] References Cited

U.S. PATENT DOCUMENTS

| | | | |
|---|---|---|---|
| 2,671,938 | 3/1954 | Roberts | 223/85 X |
| 2,795,025 | 6/1957 | Wexler | 223/9 X |
| 2,876,938 | 3/1959 | Margolin | 223/85 |
| 3,378,144 | 4/1968 | Webster | 211/4 |
| 3,568,479 | 3/1971 | Fleck et al. | 211/4 X |
| 3,581,905 | 6/1971 | Shapiro | 211/7 |
| 3,885,674 | 5/1975 | Rosenberg et al. | 211/4 |
| 3,966,100 | 6/1976 | Nelson | 211/4 |
| 4,069,691 | 1/1978 | Simpson | 211/4 |
| 4,073,415 | 2/1978 | Pegg | 223/92 |

*Primary Examiner*—Werner H. Schroeder
*Assistant Examiner*—Andrew M. Falik
*Attorney, Agent, or Firm*—Phillips, Moore, Weissenberger, Lempio & Majestic

[57] ABSTRACT

A locking device fits over the hook of an ordinary garment hanger to secure it to the hanger bar in such a way that the hanger can be moved along the bar but cannot be removed therefrom. The locking device also carries a chain or the like which can be threaded through, e.g., a sleeve of the garment and hooked to the locking device. When unlocked, the device allows removal of the lock, hanger, chain and garment as a unit, or of the lock and/or chain alone; when locked the device and chain secure both the hanger and the garment to the bar. The entire device can easily be placed and removed from the hanger and garment in an easy motion as needed. For additional security, the key may be made removable only in the locked position.

9 Claims, 6 Drawing Figures

GARMENT HANGER LOCK

BACKGROUND OF THE INVENTION

Devices for lockably securing garments to a garment rack are known in many forms. Typical examples of such devices are U.S. Pat. No. 3,378,144 to N. E. Webster, one of the co-inventors herein, and U.S. Pat. No. 4,073,415 to F. R. Pegg.

Known devices of this type have a disadvantage in that they either require special hangers and/or extra equipment associated with the garment rack (see U.S. Pat. No. 4,069,691 to B. W. Simpson). Another popular garment-securing device shown in U.S. Pat. No. 3,885,674 to T. & H. Rosenburg does not prevent separation of the hanger from the garment rack and has the further disadvantage of requiring the garment-securing chain or cable to be removed from the garment before the garment can be moved away from the rack for display to a customer.

The prior art devices are consequently not fully suitable for the handling of secured garments in an ordinary store environment, nor are they suitable for applications in which garments hung on ordinary hangers need to be temporarily firmly secured to a garment rack (e.g., while being transported) and then rehung with a minimum of labor.

SUMMARY OF THE INVENTION

The present invention solves the above described problems by providing a locking device adapted to fit over the neck of most ordinary hangers in such a way that when the locking device is in locked position, the hanger is secured against separation from the hanger bar of the garment rack, but is still laterally moveable along the hanger bar. A chain, cable, cord or the like may be used in association with the locking device so that the garment can be secured to the locking device when it is locked. To facilitate handling of garments in a store environment, the device of this invention is configured so as to allow removal of the lock assembly, hanger, garment, and securing chain as a unit from the hanger bar for display of the garment to the customer by a salesman. In so doing, the chain does not need to be removed from the sleeve of the garment.

In accordance with a further aspect of the invention, the locking device of this invention, together with the securing chain or cable, can be quickly removed from the hanger and garment in a single motion when, for example, the customer wishes to take the garment into a fitting room to try it on. The locking mechanism of this invention may further be so designed that the key cannot be removed from the device unless it is in locked position, thus preventing the salesperson from accidentally forgetting to relock the device after displaying a garment to a customer.

DETAILED DESCRIPTION OF THE INVENTION

Figure 1:
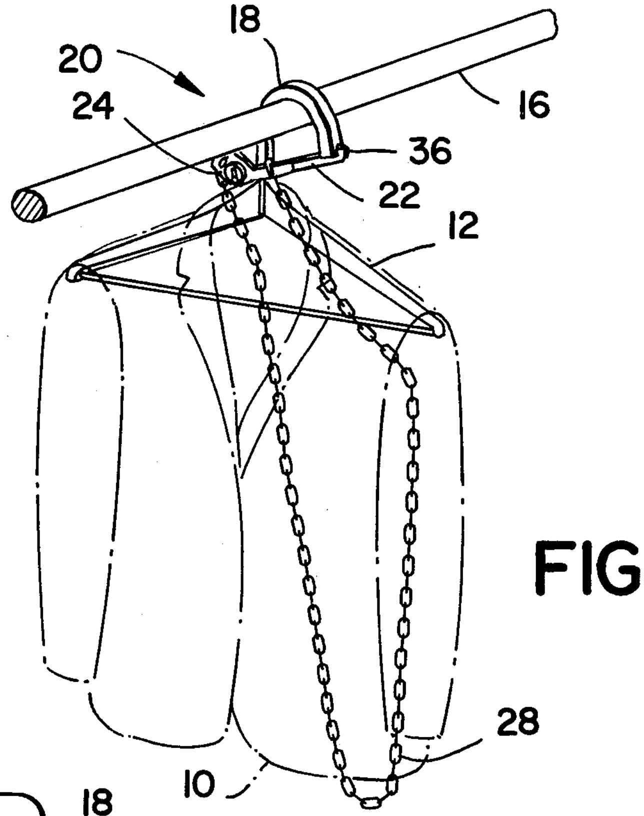
FIG. 1 is a perspective view illustrating the use of the device of this invention in securing a garment and hanger to a garment rack.

FIG. 1 illustrates the use of the inventive device in connection with a garment rack, as for example in a clothing store. The garment 10 is hung on an ordinary garment hanger 12 which has the usual curved hook 14. The hook 14 is hooked over the hanger bar 16 in the usual way, and the cover portion 18 of the locking device 20 of this invention is placed over the hook 14. To secure the hanger 12 to the hanger bar 16, the tongue portion 22 of the locking device 20 is moved into the position where, together with the cover portion 18, it encircles the hanger bar 16 and prevents removal of the hanger 12 from the bar 16. The tongue portion 22 is secured in locked position by a lock 24 associated with the locking device 20 and operated, for example, by a key 26.

Figure 2:
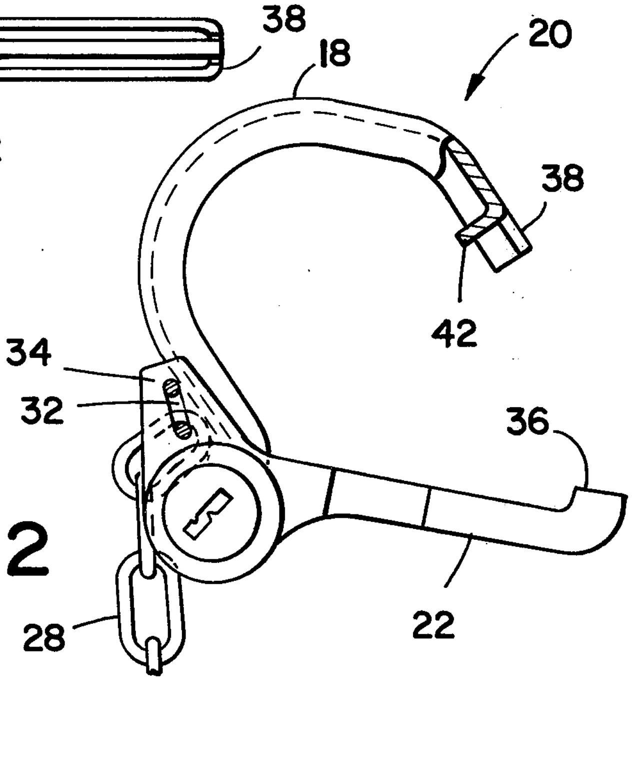
FIG. 2 is a side elevation of the locking device in open position.

One end of a chain or other suitable elongated, flexible element 28 may be secured to the locking device 20. In the embodiment shown in the drawings, the chain 28 is passed through a sleeve of the garment 10 as shown, and its other end is slipped over the tongue portion 22 in such a way that it cannot be removed therefrom unless the tongue portion 22 is moved to the unlocked position illustrated in FIG. 2.

In the locked condition of the device shown in FIG. 1, the garment and hanger can be moved laterally along the bar 16 as necessary, but neither can be removed therefrom. If a salesperson wishes to display the garment to a customer as, for example, by taking it to a window, it is merely necessary for the salesperson to insert the key 26 into the lock 24, move the tongue portion 22 to the open position, and grasp the garment by the hanger to remove it from the bar 16. Inasmuch as the locking device 20 rests on top of the hook 14, it will not fall off, and inasmuch as the end of the chain 28 which is hooked over tongue portion 22 is below the level of bar 16, it does not need to be disengaged from the tongue portion 22. The dog 36 at the forward end of tongue portion 22 keeps the chain from falling off the tongue portion 22 when the device is unlocked. If the customer now wishes to see another garment, the salesperson need merely hang the entire assembly back over the bar 16, move the tongue portion 22 back to its locked position, and remove the key. The process can then be repeated.

If, on the other hand, the customer desires to try on the garment, the salesperson simply lifts the locking device 20 off the hook 14, disengages the end of chain 28 from the tongue portion 22, and pulls the chain out of the sleeve of garment 10, in a single, quick motion. The garment hanger can now be used like any conventional hanger. During this time, the locking device 20 can be secured in some convenient place, out of the reach of the customer if needed, or left hanging on the hanger hook until the garment is ready to be placed back on the hanger and locked.

Figure 5:
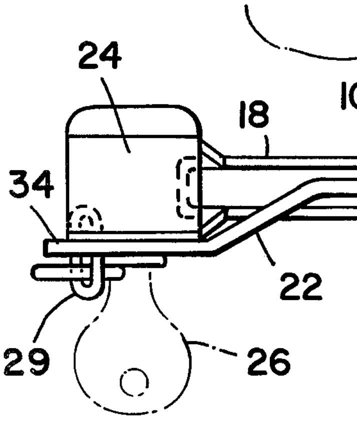
FIG. 5 is a plan view of the locking device.

In accordance with a further aspect of the invention, means may be provided to make it impossible to remove the key except in the locked position. This feature prevents the salesperson's accidentally leaving the device 20 unlocked after returning the garment 10 to the hanger bar in order to show another garment to the customer. It can be provided in a variety of ways; for example, the lock may be of a commercially available type in which the key can only be removed in the locked position; or, as shown in the drawings, the first link 29 of the chain 28 may be secured in slot 32 in such a way (see FIG. 5) as to abut against the cover portion 18 when the locking device is opened (see FIG. 2). This prevents the lock 24 from being rotated to its full open position (90° in most conventional locks of the type shown), thus causing the key to remain caught in the lock when the locking device 20 is as open as it will go.

Figure 3:
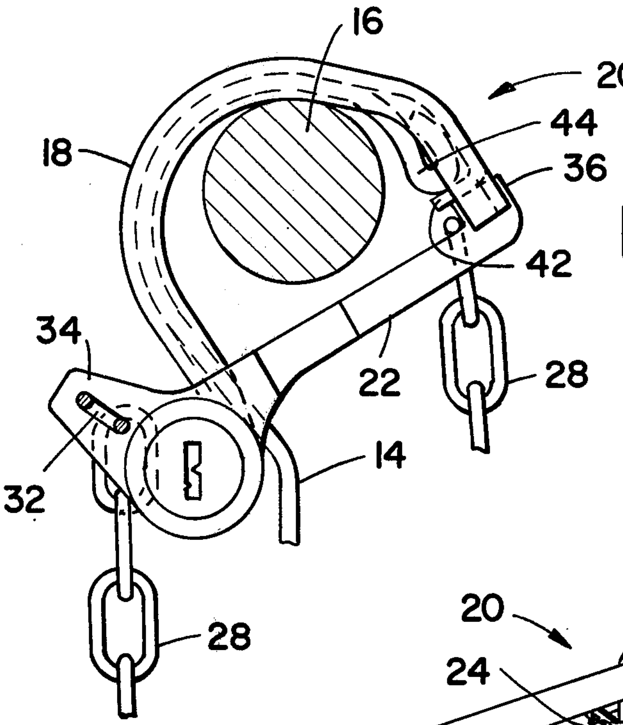
FIG. 3 is a side elevational view similar to FIG. 2 but showing the device in locked position holding a garment hanger to a hanger bar.

The construction and operation of the locking device 20 is illustrated in more detail in FIGS. 2 through 5. The cover portion 18 of the locking device 20 is shaped, as best shown in FIG. 3, to receive the curved hook of a standard garment hanger in the channel 30 in FIG. 4. An exact fit between the hook 14 and the channel 30 is not required, as it is merely necessary that hook 14 be prevented from slipping out from under the cover portion 18 when the locking device 20 is locked.

In the preferred embodiment shown in the drawings, the tongue portion 22 is hinged to the cover portion 18 through the intermediary of the lock 24. By turning the key 26 in lock 24, the tongue portion 22 can be moved between the open position shown in FIG. 2 and the closed or locked position of FIG. 3. It will be noted that while, in the preferred embodiment shown, one end of the chain 28 is permanently secured to a slot 32 on the rear flange 34 of tongue portion 22, the other end of chain 28 can be slipped over the dog 36 at the forward end of tongue portion 22. When the locking device 20 is locked, the dog 36 engages a slot 38 formed in the forward end of cover portion 18 so as to prevent removal of the chain 28 from tongue portion 22.

It will be noted that the slot 38 is preferably formed by bending a section of the cover portion 18 rearwardly to form a flange 44 on which the tip 46 of the hanger hook 14 is adapted to rest. In this manner, the cover portion 18 is prevented from accidentally separating from the hook 14 when grasped and lifted, because it takes a purposeful pivoting motion (clockwise in FIG. 3) about the hook tip 46 to separate the cover portion 18 from the hook 14.

The dog 36 also holds the chain 28 clear of the cover portion 18 as the lock closes, and as previously mentioned, prevents the chain 18 from falling off the tongue portion 22 when the lock is opened.

Figure 6:
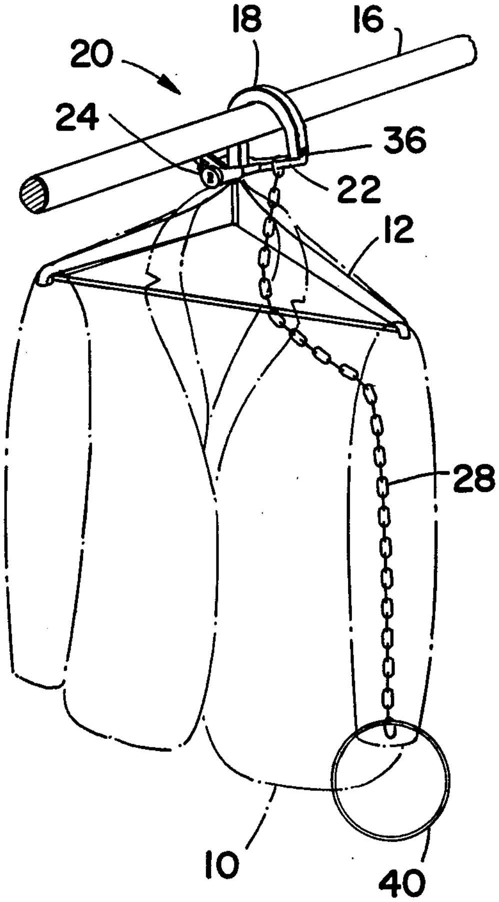
FIG. 6 is a generally elevational view illustrating another embodiment of the invention.
Figure 4:
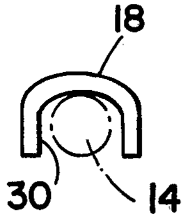
FIG. 4 is a vertical section along line 4—4 of FIG. 2.

It will be understood that the tongue portion 22 need not necessarily be hinged to the cover portion 18; it may be slidably mounted thereagainst, or may even be removable therefrom, without departing from the invention. Also, the chain 28 may have one affixed to the cover portion 18 rather than the tongue portion 22; or, as shown in FIG. 6, it may not be affixed to the locking device 20 at all. In that eventuality, one end of the chain 28 would preferably be attached to a large ring 40 or similar device which does not fit through the sleeve of the garment 10, while its other end is adapted to be hooked over tongue portion 22. For that matter, if for some reason it is desired to secure the hanger 12 to the bar 16 without securing the garment, the chain may be dispensed with altogether.

We claim:

1. A security device for individually securing the hanging hook of a conventional clothes hanger to a hanger bar, comprising:
   (a) a generally hook-shaped first portion for engaging said hanger bar, said first portion being shaped to releasably encompass a substantial portion of the hook of said clothes hanger when said first portion engages said hanger bar;
   (b) a second portion movable into and out of a position where it cooperates with said first portion to prevent disengagement of said first portion from said hanger bar; and
   (c) locking means arranged to selectively lock said second portion to said first portion into said disengagement-preventing position.

2. The device of claim 1, in which said locking means are key-operated and are arranged to allow removal of said key only when said second portion is in said disengagement-preventing position.

3. The device of claim 2, in which said locking means are rotatable between a partially open and a closed position, and means are provided to prevent said locking means from being rotated to their full open position.

4. The device of claim 1, in which said first portion includes flange means arranged to engage the tip of said hook in such a manner as to require a pivotal motion of said first portion about said tip to disengage said first portion from said hook.

5. A security device for securing to a hanger bar both the hook of a conventional clothes hanger and a garment hung thereon, comprising:
   (a) a generally hook-shaped first portion arranged to removably fit over said hanger bar and to engage the same, said first portion being shaped to encompass a substantial portion of the hook of said clothes hanger when said first portion engages said hanger bar;
   (b) a second portion movable into and out of a position where it cooperates with said first portion to prevent disengagement of said first portion from said hanger bar;
   (c) locking means arranged to selectively lock said second portion to said first portion into said disengagement-preventing position;
   (d) apparel-securing means arranged to be secured to at least one of said portions when said second portion is in said disengagement-preventing position, and to be released therefrom when it is out of said position.

6. The device of claim 5, in which said apparel-securing means includes an elongated, flexible element arranged to have an end secured to said device in such a manner as to be releasable therefrom when said second portion is out of said disengagement-preventing position.

7. The device of claim 6, in which the other end of said flexible element is attached to said device.

8. The device of claim 6, in which the other end of said flexible device is attached to an object of sufficient size to prevent it from passing through the sleeve of said garment.

9. The device of claim 6, in which said second portion includes dog means arranged to releasably retain said end on said second portion when said second portion is out of said disengagement-preventing position.

* * * * *